Patented Apr. 4, 1950

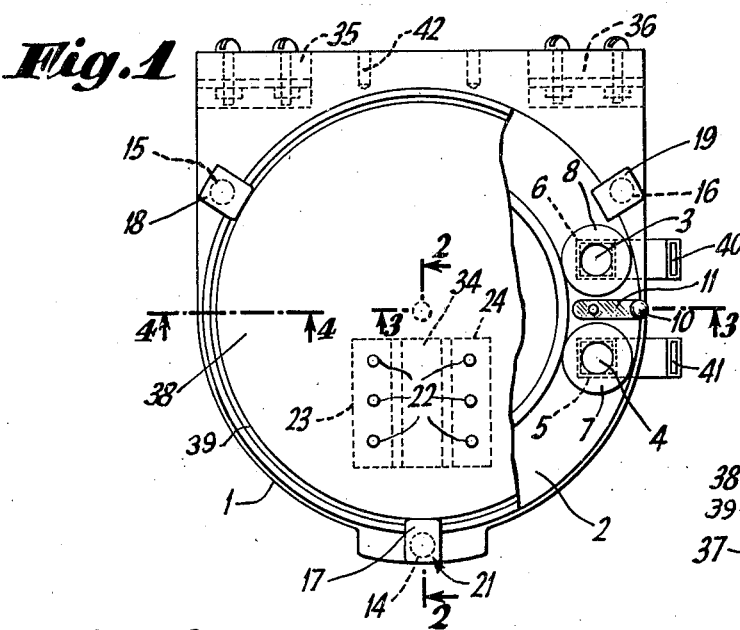
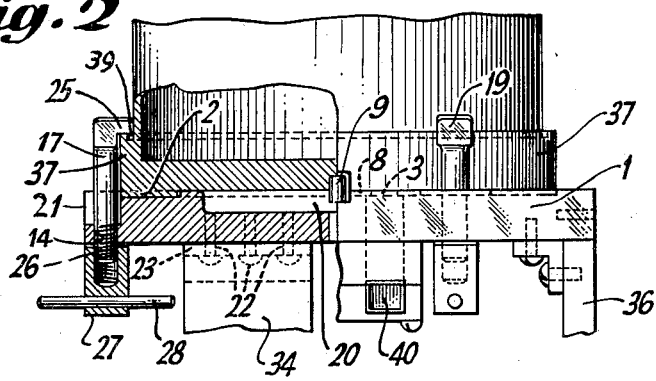
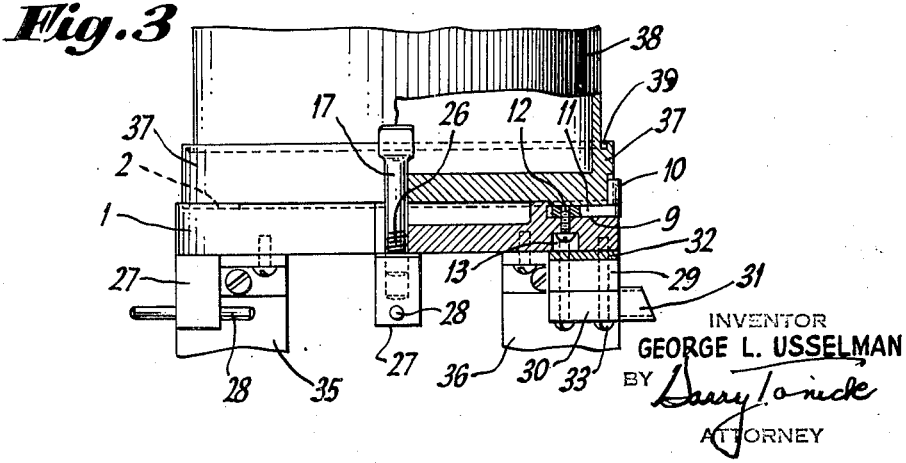

2,502,904

UNITED STATES PATENT OFFICE 2,502,904

MOUNTING BASE FOR WATER-COOLED TRANSMITTER TUBES

George L. Usselman, Port Jefferson, N. Y., assignor to Radio Corporation of America, a corporation of Delaware Application December 2, 1947, Serial No. 789,199

5 Claims. (Cl. 250—27.5)

This invention relates to a mounting base for a fluid cooled tube jacket for a radio transmitting tube.

The mounting base of this invention is especially adapted for the type of transmitting fluid cooled tube jacket disclosed in Usselman and Young copending U. S. application Serial No. 771,008, filed August 28, 1947.

An object of this invention is to provide an improved mounting base for a fluid cooled transmitting tube, the chief advantages being its convenience and simplicity of operation.

Prior art types of fluid cooled tubes generally required the use of tools for connecting and disconnecting the fluid circuit from the mounting base when it was necessary to change tubes, due to failures, such as when the tube is burned out, etc.

The specific embodiments of this invention are used with fluid cooled tubes of a radio transmitting circuit, particularly of the power amplifier stages.

The invention will best be understood by referring to the accompanying drawing, in which:

Fig. 1 is a top view of the mounting base with the vacuum tube and its jacket removed;

Fig. 2 is an elevational view, partly in section, showing a portion of the tube and jacket mounted upon the base of this invention;

Fig. 3 is a front elevation, partly in section, of Fig. 1; and

Fig. 4 is a cross-section along line 4—4 of Fig. 1.

Referring to the drawing in detail, the base 1 is constructed of heavy metal, preferably brass, which is machined or moulded to the shape indicated. A large countersunk channel 2 is provided which is concentric with the front curved portion of the base. The channel 2 is about one inch wide and $\frac{3}{32}$ to $\frac{3}{32}$ inches deep. Two fluid cooling holes or ports 3, 4 are located in the central portion of the channel 2. The upper portion around each fluid hole has countersunk portions 5, 6 in which are located rubber or plastic gaskets 7, 8 for preventing fluid leakage. Midway between the holes there is located a keyway 9 to contain the positioning pin 10 and key 11. This key and pin are held down by a small round head-screw 12 located in the counterbored hole 13. (See Fig. 3). Three holes 14, 15 and 16 are drilled through the base (as shown in Fig. 1) just outside the channel 1, and are located 120° apart, so that they are positioned just outside the bottom end of the tube jacket periphery. These holes are for receiving the clamping bolts 17, 18 and 19. The central area 20 is recessed to lighten the base, and also so that nothing can press up against the central portion of the tube jacket. A cut out portion 21 is made in the outer end of the base to receive the head of the particular clamping bolt 17. The recessed portion 20 has located therein six threaded holes, all designated 22, for mounting the base 1 on insulators by means of angle members 23 and 24. The clamping bolts 17, 18 and 19 each have a slotted head 25 and a lower threaded end portion 26 on which is screwed the clamp nut 27. A pin type handle 28 passes through the lower end of the clamping nut 27 (as shown by Figs. 2 and 3) for thumb tightening.

The positioning pin 10 and key 11 are preferably made from one piece of metal, either stainless steel or tough brass. Two pieces of block metal 29, 30 form the inlet and outlet fluid pipe flange 31 which is screwed on with a rubber gasket 32 located between it and the base 1. The two blocks of metal 29 and 30 are soldered together after the slot and hole is made in them for the water pipe. Six round head-screws, all of which are designated 33, hold the flange 31 against the bottom of the base; they also form the electrical connection from the tank coil to the tube anode and the mounting base.

Metallic base 1 is mounted upon three insulators 34, 35 and 36 located as shown. These insulators may be of any suitable insulating material, such as, for example, Mycalex or porcelain. These insulators are necessary to keep the tube anode insulated from ground or an equivalent potential.

In the operation of this device, in order to place a vacuum tube with its soldered on jacket (as described in the above mentioned patent application Serial No. 771,008) in position on the transmitter assembly, all the clamps 17, 18 and 19 are loosened and have their notched side of the head turned outward from the center. It will be noted that the head of the outer clamp 17 disappears into the recess 21, so that the tube and jacket may be slid or moved in onto the base without difficulty. Next, each one of the clamping bolts is moved upward until the head is above the clamping ring 37 of the tube jacket 38, and turned around 180°. Then the notch in the clamp head of each bolt is fitted into the groove 39 in the clamping ring 37 on the bottom end of the tube jacket. Tightening the clamp nuts 27 holds the tube jacket 38 down against the mounting base 1, and it also applies pressure on the two gaskets 6 and 7 to prevent any leakage of the cooling fluid.

When the tube jacket is being moved into place on the base 1, care must be exercised to see that the positioning pin 10 fits into the groove on the lower end of the tube jacket. This insures that the cooling fluid holes or ports in the tube jacket and mounting base are in alignment for proper operation. The tube jacket is constructed so that it will not fit onto the base, and the clamp bolts cannot be fastened unless the positioning pin 10 fits into the notch on the tube jacket.

To remove a damaged or burnt out tube from the transmitter assembly, the reverse operation to that mentioned is performed; that is, the clamping bolts 17, 18 and 19 are loosened, turned 180°, and then let down, and the head of the outer clamping nut 17 is permitted to disappear in the recess 21. In this position, the tube with its jacket can be moved out of the base without difficulty.

For supplying the tube jacket with water, square (or round) copper tubes 40 and 41 are soldered to the member 31 and are located just below the mounting base. The threaded holes 42 are for mounting the tank condensers (not shown) in their relative positions with respect to the transmitting tube.

What is claimed is:

1. A mounting base for centering and locating a fluid cooled vacuum tube of the type having anode cooling ducts, a jacket and a clamp ring on the lower portion of said tube, said mounting base comprising a base plate with two cooling ducts and a channel therein to receive and locate the clamp ring of the fluid cooled vacuum tube, means on said base plate to position said fluid cooled vacuum tube thereon in its operative position with respect to said base plate with the ducts of said tube in register with the ducts of said base plate, a plurality of clamp members retained on said base plate adjacent said channel, and gripping means on said clamp members to engage the clamp ring on said fluid cooled vacuum tube.

2. A mounting base for centering and locating a fluid cooled vacuum tube of the type having an anode cooling jacket, fluid ducts and a clamp ring on the lower portion of said tube, said mounting base comprising a base plate with two cooling ducts, said base plate having a channel therein to receive and locate the clamp ring of the fluid cooled vacuum tube, means on said base plate to position said fluid cooled vacuum tube thereon in its operative position with respect to the cooling ducts thereof, a plurality of threaded clamp members retained in apertures in said base plate, and gripping means on said threaded clamp members to engage the clamp ring on said fluid cooled vacuum tube.

3. A mounting base for a fluid cooled vacuum tube of the type having an anode cooling jacket, cooling ports and a clamp ring on the lower portion of said tube, said mounting base comprising a base plate having an annular channel and fluid cooling ports located therein to receive the clamp ring on said tube, means on said base plate and said clamp ring to position said tube on said base plate in its operative position with respect to cooling ports of said base plate, and a plurality of clamping members passing through apertures in said base plate and having gripping means to engage the clamp ring of said fluid cooled vacuum tube.

4. A mounting member for a fluid cooled vacuum tube of the type having an anode cooling jacket and a clamp ring on the lower portion of said tube, said mounting member comprising a base plate having an annular channel portion and a recessed portion, a plurality of clamping members retained in apertures in said base plate to permit at least one of said clamping members to drop below the surface of said plate into said recessed portion, and means on said clamping members for tightening said clamping members to retain said tube in an operative position on said base plate with said clamp ring in the channel portion of said base plate.

5. A mounting base for a fluid cooled vacuum tube of the type having an anode cooling jacket provided with cooling ports and a slotted clamp ring on the lower portion of said tube, said mounting base comprising a base plate having an annular channel and fluid cooling ports, resilient gasket members seated in said fluid cooling ports of the base plate to make a fluid tight seal between the cooling ports on said vacuum tube and an external fluid source, means including a pin on said base plate which enters the slot in said clamp ring to place said vacuum tube in its operative position with respect to the cooling ports of said base plate with said clamp ring seated in said channel, a plurality of threaded clamp members passing through apertures in said base plate and having gripping means to engage the clamp ring of said fluid cooled vacuum tube, and a threaded nut on each clamp member, each threaded nut being located below the channel in said base plate.

GEORGE L. USSELMAN.

REFERENCES CITED

The following references are of record in the file of this patent:

UNITED STATES PATENTS

| Number | Name | Date |
|---|---|---|
| 1,166,196 | Eaton | Dec. 28, 1915 |
| 1,912,769 | Hansell | June 6, 1933 |
| 1,930,524 | Laport | Oct. 17, 1933 |
| 1,944,748 | Leach | Jan. 23, 1934 |
| 2,146,541 | Hansell | Feb. 7, 1939 |
| 2,186,563 | Suydam | Jan. 9, 1940 |